United States Patent
Bonneau et al.

(12) 
(10) Patent No.: US 6,613,122 B1
(45) Date of Patent: Sep. 2, 2003

(54) MICRONIC PRE-ALLOYED METAL POWDER BASED ON THREE-DIMENSIONAL TRANSITION METAL

(75) Inventors: Maxime Bonneau, Le Fontanil (FR); Sebastien Chabord, Grenoble (FR); Guy Prost, Saint Nazaire les Eymes (FR)

(73) Assignee: Eurotungstene Poudres, Grenoble (FR)

( * ) Notice: Subject to any disclaimer, the term of this patent is extended or adjusted under 35 U.S.C. 154(b) by 0 days.

(21) Appl. No.: 09/581,566

(22) PCT Filed: Oct. 15, 1999

(86) PCT No.: PCT/FR99/02519

§ 371 (c)(1), (2), (4) Date: Oct. 10, 2000

(87) PCT Pub. No.: WO00/23631

PCT Pub. Date: Apr. 27, 2000

(30) Foreign Application Priority Data

Oct. 16, 1998 (FR) .............................. 98 13031

(51) Int. Cl.$^7$ .................................. B22F 1/00
(52) U.S. Cl. ............................. 75/255; 75/246; 75/243; 419/11; 252/62.55; 428/546
(58) Field of Search ................ 75/255, 243, 246; 252/62.55; 419/11; 428/546

(56) References Cited

U.S. PATENT DOCUMENTS

| | | | | |
|---|---|---|---|---|
| 2,002,689 A | * | 5/1935 | Bozorth | ............. 148/108 |
| 3,190,748 A | * | 6/1965 | Landgraf | ............. 75/345 |
| 4,054,530 A | * | 10/1977 | Deffeyes | ............. 252/62.54 |
| 4,158,719 A | * | 6/1979 | Frantz | |
| 4,657,583 A | * | 4/1987 | Crane et al. | |
| 5,260,132 A | * | 11/1993 | Nakazumi et al. | ............. 428/403 |
| 6,312,497 B1 | * | 11/2001 | Standaert | ............. 75/255 |

FOREIGN PATENT DOCUMENTS

| | | |
|---|---|---|
| GB | 2 328 218 | 2/1999 |
| WO | WO 97 21844 A | 6/1997 |
| WO | WO 98 49361 A | 11/1998 |

OTHER PUBLICATIONS

Chemical Abstracts, vol. 108, No. 24, Jun. 13, 1988, Ya et al, "Levitation–jet method for condensation synthesis of ultrafine powders of alloys and metal oxides and their structure".

Chemical Abstracts, vol. 118, No. 14, Saida et al, "Manufacture of alloy fine powders".

Chemical Abstracts, vol. 121, No. 14, Uami et al, "Low–alloy steels for manufacture of precision parts by powder metallurgy".

Chemical Abstracts, vol. 120, No. 22, Hanaoka et al, "Fe–Cu–Ni composite powders for powder metallurgy, the prepn. Method, and sinsters using the powders".

Engstroem et al, "Powders and Processes for High Performance PM Steels", Powder Metallurgy, GB, Metals Society, London, vol. 35, No. 1, Jan. 1, 1992.

* cited by examiner

*Primary Examiner*—Ngoclan Mai
(74) *Attorney, Agent, or Firm*—Nixon & Vanderhye, P.C.

(57) ABSTRACT

The invention concerns a pre-alloyed metal powder essentially consisting of at least two transition metals selected among iron, cobalt, nickel, copper and zinc, and also capable of containing molybdenum, as well as sintered parts obtained using said powders. Said powders have elementary grain size greater than 200 nm and less than 5 $\mu$m. The invention is particularly useful for making special steel parts or for making cutting or grinding tools.

36 Claims, No Drawings

MICRONIC PRE-ALLOYED METAL POWDER BASED ON THREE-DIMENSIONAL TRANSITION METAL

The invention relates to novel metal micropowders based on 3d transition metals.

It is known that an important branch of metallurgy is based on the production of powders which may be used in particular as pigments or in the production of sintered parts.

The metal parts used specifically are generally metal alloys. It will be recalled that metal alloys, depending on the mutual solubility characteristics of the constituent metals, may be single-phase or multiphase systems.

The production of sintered parts using a mixture of pure metal powders gives rise to difficulties when the desire is to obtain a homogeneous sintered part.

It is therefore desirable to prepare prealloyed powders, in which each particle contains the constituent metals of the alloy in the same proportions as the powder in its entirety.

In order to obtain prealloyed powders, it is possible in particular to utilize techniques of coprecipitation of metal hydroxides or salts. The coprecipitates, after drying and, optionally, grinding, are subjected to the action of a reducing agent, for example hydrogen, to give metal powders.

When it is desired to operate starting from water-soluble salts, it is possible to prepare suspensions containing the metal hydroxides or salts in the required proportions and to subject the resulting suspensions to an operation of co-spray drying. This gives particles whose composition in terms of metal hydroxides and/or salts is homogeneous. These particles may be subsequently reduced to prealloyed metal powders with the aid of a reducing agent.

It is known that the techniques of manufacturing metal powders generally lead to agglomerates consisting of a plurality of elementary grains connected to one another at points. Grinding techniques generally enable the number of individual elementary grains to be increased and the number of elementary grains present in the aggregates to be reduced.

As indicated above, the invention relates to micropowders. In the present specification, "micropowders" are powders such that the largest dimension of the elementary grains is greater than 200 nm and less than to 5 micrometres. The dimensions of the elementary grains may be measured in particular under the scanning electron microscope. The micropowders must be differentiated from nanometric powders, whose elementary grains have dimensions of less than approximately 100 nm.

The invention relates to novel metal powders based on at least two 3d transition metals selected from iron, cobalt, nickel, zinc and copper, and possibly further comprising molybdenum.

The powders of the invention possess advantageous properties in diverse applications, as will be specified in the remainder of the description.

The invention therefore provides a prealloyed metal powder consisting essentially of at least two transition metals selected from iron, cobalt, nickel, copper and zinc, and possibly further comprising molybdenum when the iron content is greater than or equal to 50% by weight and, optionally, from 0 to 3% by weight of an additive, the said prealloyed metal powder having elementary grain dimensions, measured under the scanning electron microscope, of greater than 200 nm and less than 5 $\mu$m; and a sintered part obtained with the aid of such a powder.

In the present specification, unless indicated otherwise, a powder "consisting essentially" of such and such a metal ("essential" constituents) contains each of these metals in a proportion of more than 1% by weight, and in particular of more than 3% by weight. Such a constituent, when it may be used in a proportion of less than 3%, and in particular of less than 2% or less than 1%, is then considered to be an additive to the alloys in which it is present in such low proportions.

The additives may, in practice, be any metals or metalloids which are capable of improving the properties of the powders or of the sintered parts. Within a given powder, the additives may be selected in particular from all metals which are not essential constituents (as defined above) of the powder, or the oxides of these metals.

The purpose of the presence of additives may in particular be to improve the sintering operations. It is known that the presence of an additive, even in very small amounts (for example, of the order of 0.1%), often makes it possible to reduce considerably the sintering temperature.

The selection of the additives and of their amount may be determined by means of simple, routine experiments.

In the present specification, the percentages of metals are percentages by weight, relative to the total weight of the metals of the powder.

It is known that metal powders have a tendency to undergo oxidation in air, this oxidation increasing over time and with the oxidizability of the metals present. In the powders of the invention, the total oxygen content (measured by reduction using carbon) at the exit from the oven in which the metal hydroxides and/or salts have been reduced is generally less than 2% relative to the total weight of the powder. By optimizing the operating conditions of the hydrogen reduction it is possible, if desired, to obtain markedly lower oxygen contents.

The powders of the invention may be prepared in accordance with the methods of coprecipitation and, optionally, of spray drying, followed by reduction, which have been described above and which are known per se. The selection of the temperature and of the time of reduction may be determined with the aid of simple, routine experiments, in particular by thermogravimetric analysis. It is possible to optimize the size of the elementary grains, in awareness that this size increases with the temperature and with the duration of heating, during the reduction operation.

A more detailed description will now be given below of certain classes of powder which form part of the invention. Of course, the invention also relates to sintered parts obtained from such powders, and more generally to any finished industrial articles comprising these powders.

Among the powders of the invention, mention may be made in particular of (a) those consisting essentially of from 50% to 98% by weight of iron, from 2% to 40% by weight of nickel, from 0 to 10% by weight of copper and from 0 to 10% by weight of molybdenum, and optionally comprising at least one additive in an amount not greater than 3% by weight. The additive is, for example, tungsten.

Among these powders, mention may be made in particular of those containing at least 60%, and in particular at least 65%, of iron.

Particular mention may be made of the powders consisting essentially of iron and nickel; of iron, nickel and molybdenum; of iron, copper or nickel; or of iron, copper, nickel and molybdenum.

Such powders are used to prepare special sintered steels.

(b) those which consist essentially of from 20 to 80% by weight of cobalt, and from 20 to 80% by weight of nickel, and optionally comprise at least one additive in an amount not greater than 3% by weight.

Such powders may be used in particular to prepare, by sintering, cemented carbides (containing tungsten carbide) and cermets (containing titanium carbide).

(c) those con sisting essentially of from 60 to 95% by weight of copper and from 5 to 40% by weight of zinc and comprising at least one additive in an amount not greater than 3% by weight.

Such powders may be used in particular in the manufacture, by sintering, of diamond tools, electrical components or materials for welds (brazing).

(d) those consisting essentially of iron, nickel and cobalt, and optionally comprising at least one additive selected from copper and tungsten, in an amount not greater than 3% by weight, the proportions of the constituents being as follows: less than 50% for the iron, from 30% to 90% for iron+nickel together, and less than 50% for the cobalt.

Mention may be made in particular of powders containing not more than 40% of iron.

Powders of this kind may be used as binders in the preparation, by sintering, of diamond tools. They may also be used as magnetic pigments (for paints, for example) or else may be used in the preparation of sintered magnets.

(e) those consisting essentially of iron, nickel and copper, and optionally comprising at least one additive in an amount not greater than 3% by weight, the proportions of the constituents being as follows: from 10% to 30% for the iron, from 30% to 50% for the copper and from 30% to 50% for the nickel; and in particular those containing from 15% to 25% of iron, from 35% to 45% of copper and from 35% to 45% of nickel.

Powders of this kind may be used in particular as binders in the preparation, by sintering, of diamond tools, or else as a basis for special sintered steels.

(f) powders consisting essentially of iron, nickel, cobalt and copper, and at least one additive, in an amount not greater than 3% by weight, the proportions of the constituents being as follows: less than 50%, and in particular less than 40%, for the iron, more than 1% to 50% for the copper, more than 1% to 50% for the cobalt, and from 30% to 90% for the iron+nickel together.

These powders may be used as a basis for special sintered steels, or else as binders for sintered diamond tools.

(g) powders consisting essentially of from 40% to 85% by weight of copper, from 5% to 40% by weight of iron, from 0% to 30% by weight of cobalt, and from 5% to 40% of zinc.

These powders may be used in particular as binders for sintered diamond tools.

The invention likewise relates to the use of a powder as defined above as a magnetic pigment in paints or as a powder permitting the production of sintered parts which may be used as electrically conductive parts, welds, magnets, special steels, or tungsten carbide or titanium carbide or diamond abrasive or cutting tools. The fields of application of the different categories of powders have been specified above.

Generally speaking, the powders of the invention, used to obtain sintered parts, have the advantage of enhancing the mechanical or physical properties of the parts obtained and/or the advantage of facilitating sintering by making it possible, in particular, to operate at relatively low temperatures and/or pressures and/or of improving the densification of the sintered parts.

The following examples illustrate the invention.

EXAMPLES

Example 1

An aqueous solution of zinc and copper chlorides is prepared by dissolving 7.27 kg of cupric chloride crystals and 1.64 kg of zinc chloride crystals in 40 litres of water. This solution is poured into 40 litres of an aqueous sodium hydroxide solution containing 123 g/l, heated at 60° C., so as to cause the coprecipitation of copper and zinc hydroxides. The precipitate thus obtained is subsequently separated by filtration and then washed in order to remove the sodium chloride. The precipitate is resuspended in water, then dried in a spray dryer. Reduction under hydrogen followed by deagglomeration in a hammer mill gives a metal powder assaying at 0.9% oxygen, 76.9% copper and 22.1% zinc. Under the scanning electron microscope, an average elementary grain size of approximately 3 $\mu$m is measured. By sintering without pressure, parts with a highly homogeneous microstructure and an average size of approximately 3 $\mu$m are obtained. Brinell hardness: 115.

Example 2

An aqueous solution containing the chlorides of copper, zinc and iron is prepared by dissolving 10.2 kg of cupric chloride crystals, 0.81 kg of zinc chloride crystals and 1.75 litres of a solution of ferric chloride containing 152 g/l in 22 litres of water. This solution is poured into 50 litres of an aqueous sodium hydroxide solution containing 129 g/l, heated at 60° C., so as to cause the coprecipitation of copper, zinc and iron hydroxides. The precipitate thus obtained is subsequently separated by filtration and then washed. The precipitate is resuspended in water, then dried in a spray dryer. Reduction under hydrogen followed by deagglomeration in a hammer mill gives a metal powder assaying at 1.9% oxygen, 82.5% copper, 9.3% zinc and 6% iron.

Example 3

An aqueous solution containing the chlorides of copper, nickel and iron is prepared by mixing 0.16 litre of a solution of cupric chloride (containing 211 g/l of copper) with 0.615 litre of a solution of nickel chloride (containing 170.6 g/l of nickel) and 16.63 litres of a solution of ferric chloride (containing 202 g/l of iron). This solution is poured with stirring into 40 litres of a sodium hydroxide solution assaying at 213 g/l, heated at 60° C., so as to cause the coprecipitation of copper, nickel and iron hydroxides. The precipitate thus obtained is subsequently separated by filtration and then washed. The precipitate is resuspended in water, in a proportion of approximately 5 litres of water per kg of precipitate. A solution of molybdic acid (assaying at 135 g/l of molybdenum) is added to this suspension, in a proportion of 0.01 litre of this molybdic solution per kg of precipitate. The suspension is dried in a spray dryer. Reduction under hydrogen followed by deagglomeration in a hammer mill gives a metal powder assaying at 1.39% oxygen, 93.8% iron, 3.15% nickel, 1.2% copper and 0.53% molybdenum. The specific surface area of the powder, measured by the BET method, is 0.54 m$^2$/g. The powder obtained by the above-described process is then compacted without heating into parallelepipedal test specimens with a relative density of approximately 60%, i.e., whose density represents 60% of the theoretical density. By means of a sintering operation in an oven under hydrogen (ascent to 1100° C. in 5 hours, then plateau of 1 hour at 1100° C., followed by cooling in approximately 12 hours), the parts exhibit a volume shrinkage due to sintering of 26%.

Example 4

An aqueous solution containing the chlorides of cobalt and of nickel is prepared by mixing 14 litres of a solution of cobalt chloride containing 172 g/l of cobalt with 13.7 litres of a solution of nickel chloride containing 175.9 g/l of nickel. This solution is poured with stirring into 40 litres of a sodium hydroxide solution assaying at 187.5 g/l, heated at 60° C., so as to cause the coprecipitation of cobalt and nickel hydroxides. The precipitate thus obtained is subsequently separated by filtration and then washed. The precipitate is then resuspended in water, in a proportion of approximately 5 litres of water per kg of precipitate. Drying of the suspension in a spray dryer followed by reduction under hydrogen and deagglomeration in a hammer mill gives a metal powder assaying at 0.51% oxygen, 49.7% cobalt and 49.7% nickel. Under the scanning electron microscope, an average elementary grain size of approximately 2 µm is measured. The specific surface area, measured by the BET method, is 0.86 m$^2$/g.

Examples 5 to 14

In a similar fashion, prealloyed powders were prepared whose compositions in terms of metals are as follows:

iron 97.5; nickel 2.5;

iron 85.2; nickel 9.8; molybdenum 5;

iron 83; nickel 9.1; copper 7.9;

iron 90; nickel 4.8; copper 3.1; molybdenum 2.1;

iron 13; nickel 43.5; cobalt 43.5;

iron 15; nickel 39.2; cobalt 45; tungsten 0.8;

iron 14; nickel 40.9; cobalt 44.5; copper 0.6;

iron 20.3; nickel 40; copper 39.7;

iron 35.5; nickel 49.5; copper 10.2; cobalt 4.5;

iron 11; copper 55; cobalt 19.8; zinc 14.2.

What is claimed is:

1. Prealloyed metal powder having elementary grain dimensions, measured under the scanning electron microscope, of greater than 200 nm and less than 5 µm, said powder consisting essentially of iron, nickel and cobalt, and comprising at least one additive selected from copper and tungsten, in an amount not greater than 3% by weight, the proportions of the constituents being as follows: less than 50% for the iron, from 30% to 90% for the iron+nickel together, and less than 50% for the cobalt.

2. Powder according to claim 1 wherein said at least one additive is copper.

3. Powder according to claim 1 wherein said at least one additive is tungsten.

4. Powder according to claim 1, in which the iron content is not greater than 40%.

5. Prealloyed metal powder having elementary grain dimensions, measured under the scanning electron microscope, of greater than 200 nm and less than 5 µm, said powder consisting essentially of iron, nickel and copper, and optionally comprising at least one additive in an amount not greater than 3% by weight, the proportions of the constituents being as follows: from 10% to 30% for the iron, from 30% to 50% for the copper and from 30% to 50% for the nickel.

6. Powder according to claim 5, containing from 15% to 25% of iron, from 35% to 45% of copper and from 35% to 45% of nickel.

7. Prealloyed metal powder having elementary grain dimensions, measured under the scanning electron microscope, of greater than 200 nm and less than 5 µm, said powder consisting essentially or iron, nickel, cobalt and copper, and optionally at least one additive, in an amount not greater than 3% by weight, the proportions of the constituents being as follows: less than 50% for the iron, from more than 1% to 50% for the copper, from more than 1% to 50% for the cobalt, and from 30% to 90% for the iron+nickel together, except a powder consisting of 42% of iron, 12% of nickel, 6% of cobalt and 40% of copper.

8. Powder according to claim 7, containing less than 40% of iron.

9. A sintered article obtained with the aid of a prealloyed metal powder having elementary grain dimensions, measured under the scanning electron microscope, of greater than 200 nm and less than 5 µm, said powder consisting essentially of iron, nickel and cobalt, and optionally comprising at least one additive selected from copper and tungsten, in an amount not greater than 3% by weight, the proportions of the constituents being as follows: less than 50% for the iron, from 30% to 90% for the iron+nickel together, and less than 50% for the cobalt.

10. A sintered article obtained with the aid of a prealloyed metal powder as defined in claim 2.

11. A sintered article obtained with the aid of a prealloyed metal powder as defined in claim 3.

12. A sintered article obtained with the aid of a prealloyed metal powder as defined in claim 4.

13. A sintered article obtained with the aid of a prealloyed metal powder as defined in claim 5.

14. A sintered article obtained with the aid of a prealloyed metal powder as defined in claim 6.

15. A sintered article obtained with the aid of a prealloyed metal powder as defined in claim 7.

16. A sintered article obtained with the aid of a prealloyed metal powder as defined in claim 8.

17. A method of preparing a sintered article comprising sintering a powder consisting essentially of iron, nickel and cobalt, and optionally comprising at least one additive selected from copper and tungsten, in an amount not greater than 3% by weight, the proportions of the constituents being as follows: less than 50% for the iron, from 30% to 90% for the iron+nickel together, and less than 50% for the cobalt.

18. A method of preparing a sintered article comprising sintering a powder according to claim 2.

19. A method of preparing a sintered article comprising sintering a powder according to claim 3.

20. A method of preparing a sintered article comprising sintering a powder according to claim 4.

21. A method of preparing a sintered article comprising sintering a powder according to claim 5.

22. A method of preparing a sintered article comprising sintering a powder according to claim 6.

23. A method of preparing a sintered article comprising sintering a powder according to claim 7.

24. A method of preparing a sintered article comprising sintering a powder according to claim 8.

25. A paint comprising as a magnetic pigment a powder consisting essentially of iron, nickel and cobalt, and optionally comprising at least one additive selected from copper and tungsten, in an amount not greater than 3% by weight, the proportions of the constituents being as follows: less than 50% for the iron, from 30% to 90% for the iron+nickel together and less than 50% for the cobalt.

26. The sintered article of claim 9 wherein said article is a magnet.

27. A sintered diamond tool comprising as a binder a powder consisting essentially of iron, nickel and cobalt, and optionally comprising at least one additive selected from copper and tungsten, in an amount not greater than 3% by weight, the proportions of the constituents being as follows: less than 50% for the iron, from 30% to 90% for the iron+nickel together, and less than 50% for the cobalt.

28. A sintered diamond tool comprising as a binder a powder of claim 5.

29. A sintered diamond tool comprising as a binder a powder of claim 6.

30. A sintered diamond tool comprising as a binder a powder of claim 7.

31. Powder according to claim 1 wherein said at least one additive is present in an amount of from 0.1% to 3% by weight.

32. Prealloyed metal powder having elementary grain dimensions, measured under the scanning electron microscope, of greater than 200 nm and less than 5 μm, said powder consisting essentially of iron, nickel and cobalt, and optionally comprising at least one additive selected from copper and tungsten, in an amount not greater then 3% by weight, the proportions of the constituents being as follows: less then 50% for the iron, from 54.2% to 90% for the iron+nickel together, and less than 50% for the cobalt.

33. A sintered article obtained with the aid of a powder of claim 32.

34. The sintered article of claim 33, wherein said article is a magnet.

35. A paint comprising as a magnetic pigment the powder of claim 32.

36. A sintered diamond tool comprising as a binder a powder of claim 32.

* * * * *